United States Patent [19]
Kim et al.

[11] Patent Number: 5,872,760
[45] Date of Patent: Feb. 16, 1999

[54] OPTICAL PICKUP FOR CORRECTING AN ASTIGMATIC DIFFERENCE OF LIGHT

[75] Inventors: Tae-kyoung Kim, Suwon; Pyong-yong Seong; Chul-woo Lee, both of Seoul, all of Rep. of Korea

[73] Assignee: Samsung Electronics Co., Ltd., Kyungki-Do, Rep. of Korea

[21] Appl. No.: 865,141

[22] Filed: May 29, 1997

[30] Foreign Application Priority Data

May 29, 1996 [KR] Rep. of Korea .................. 1996 18514

[51] Int. Cl.⁶ ....................................................... G11B 7/00
[52] U.S. Cl. ......................................... 369/112; 369/44.23
[58] Field of Search ................................... 369/44.23, 54, 369/109, 112, 121, 122

[56] References Cited

U.S. PATENT DOCUMENTS 5,500,849 3/1996 Noguchi ............................ 369/109 X
5,777,961 7/1998 Matsui .................................. 369/44.23

*Primary Examiner*—W. R. Young
*Attorney, Agent, or Firm*—Sughrue, Mion, Zinn, Macpeak & Seas, PLLC

[57] ABSTRACT

An optical pickup for correcting an astigmatic difference of a light by using a collimating lens arranged at an angle with respect to the thickness direction of an active layer of a light source and parallel to the width direction of the active layer, for collimating the light emitted from the light source, is provided. The collimating lens is arranged between an edge emitting laser diode having an active layer and a beam splitter, and corrects the astigmatic difference of the light emitted from the edge emitting laser diode. Therefore, a compact optical pickup can be achieved since additional optical elements for correcting the astigmatic difference of the laser beam are not required.

9 Claims, 6 Drawing Sheets

OPTICAL PICKUP FOR CORRECTING AN ASTIGMATIC DIFFERENCE OF LIGHT

BACKGROUND OF THE INVENTION

The present invention relates to an optical pickup for correcting an astigmatic difference of light emitted from a light source.

Generally, an optical pickup used for recording/reproducing information on/from a recording medium using a laser beam includes, as shown in FIG. 1, a light source 10 for generating and emitting a laser beam, a collimating lens 20 for collimating the light of the laser beam emitted from the light source 10, a light path changing means 30 for changing the traveling path of an incident light, an objective lens 40 for converging the light from the light source 10 to form a light spot on a recording surface of a recording medium 1, and a photodetector 60 for detecting an information signal and an error signal from the light reflected from the recording medium 1. Also, the optical pickup may include a cylindrical lens 50 along the optical path between the light path changing means 30 and the photodetector 60, for detecting a focus error signal by an astigmatism method. In this example, a small, light edge emitting laser diode is adopted as the light source 10.

However, as shown in FIG. 2, the edge emitting laser diode emits an elliptical light beam from an active layer 11 thereof. This is due to the difference in source points 12a and 12b of the light beam, wherein distance (ΔZ) between the source points 12a and 12b is defined as the "astigmatic difference". Accordingly, the collimating lens 20 cannot be aligned properly with respect to both source points 12a and 12b.

In order to solve the above problems, a conventional optical pickup adopts, as shown in FIGS. 3A and 3B, a pair of first and second cylindrical lenses 21 and 22 having different focal distances as a collimating lens 120. FIG. 3A is a diagram showing the first and second cylindrical lenses 21 and 22 viewed from the Y-axis (see FIG. 2), i.e., the thickness direction of the active layer 11, and FIG. 3B is a diagram showing the first and second cylindrical lenses 21 and 22 viewed from the X-axis, i.e., the width direction of the active layer 11.

Assuming that the focal distance of the first cylindrical lens 21 is $f_1$, and that of the second cylindrical lens 22 is $f_2$, the relationship of a diameter $W_o$ of light which has passed through the first and second cylindrical lenses 21 and 22 and the diameter $W_i$ of light which has not passed through the first and second cylindrical lenses 21 and 22 is defined as follows.

$$W_o = \frac{f_2}{f_1} W_i$$

Accordingly, the diameter of the light beam along the X-axis can be matched to that of the light beam along the Y-axis through adjustment of the diameter of the beam in the X-axial direction by the first and second cylindrical lenses 21 and 22.

However, there are difficulties in manufacturing a lens having excellent wavefront aberration and adjusting the optical axis for the above method.

Another conventional optical pickup for correcting an astigmatic difference further includes a prism 23 shown in FIG. 4 together with the collimating lens 20 shown in FIG. 1. Assuming that the incident light angle of a light upon a receiving surface of the prism 23 is $\theta_i$ and the emitting angle of a light from an emitting surface thereof is $\theta_o$, the relationship of a diameter $W_o$ of light which has passed through the prism 23 and the diameter $W_i$ of light which has not passed through the prism 23 is defined as follows.

$$W_o = \frac{\cos\theta_o}{\cos\theta_i} W_i$$

Accordingly, the astigmatic difference of the light emitted from the light source can be corrected with the use of the prism.

However, in the conventional optical pickup which further includes a prism 23 together with a collimating lens 20, if there is a tilt or shift in the light path, the assembly process becomes complicated. Also, since the optical path is elongated, it is difficult to manufacture a compact optical pickup.

In another conventional optical pickup, as shown in FIG. 5, a flat glass 24 between the light source 10 and the collimating lens 20 (see FIG. 1) is further included. The flat glass 24 is arranged at an angle with respect to the emitted light and integrally formed with a housing 25 protecting the light source 10. However, a coma aberration occurs due to the coupling of the flat glass 24 and the collimating lens 20.

SUMMARY OF THE INVENTION

To solve the above problems, it is an object of the present invention to provide an optical pickup for correcting an astigmatic difference of a light emitted by a light source by changing the arrangement of the conventional optical elements without requiring additional optical elements.

To achieve the above object, an optical pickup including a light source, such as an edge emitting laser diode having an active layer for generating and emitting a laser beam, and a collimating lens for collimating the light emitted from the light source are provided. The collimating lens is arranged at an angle with respect to the thickness direction of the active layer of the edge emitting laser diode and parallel to the width direction of the active layer. Preferably, the collimating lens is arranged at an angle between 0.3° and 1.3° with respect to the thickness direction of the active layer. After the astigmatic difference is corrected by the angled collimating lens, the light path of the collimated light is changed by a light path changing means such as a beam splitter, and then the light is converged by an objective lens onto a recording medium. Also, a photodetector detects information and error signals by receiving the light reflected from the recording medium.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

Figure 1:
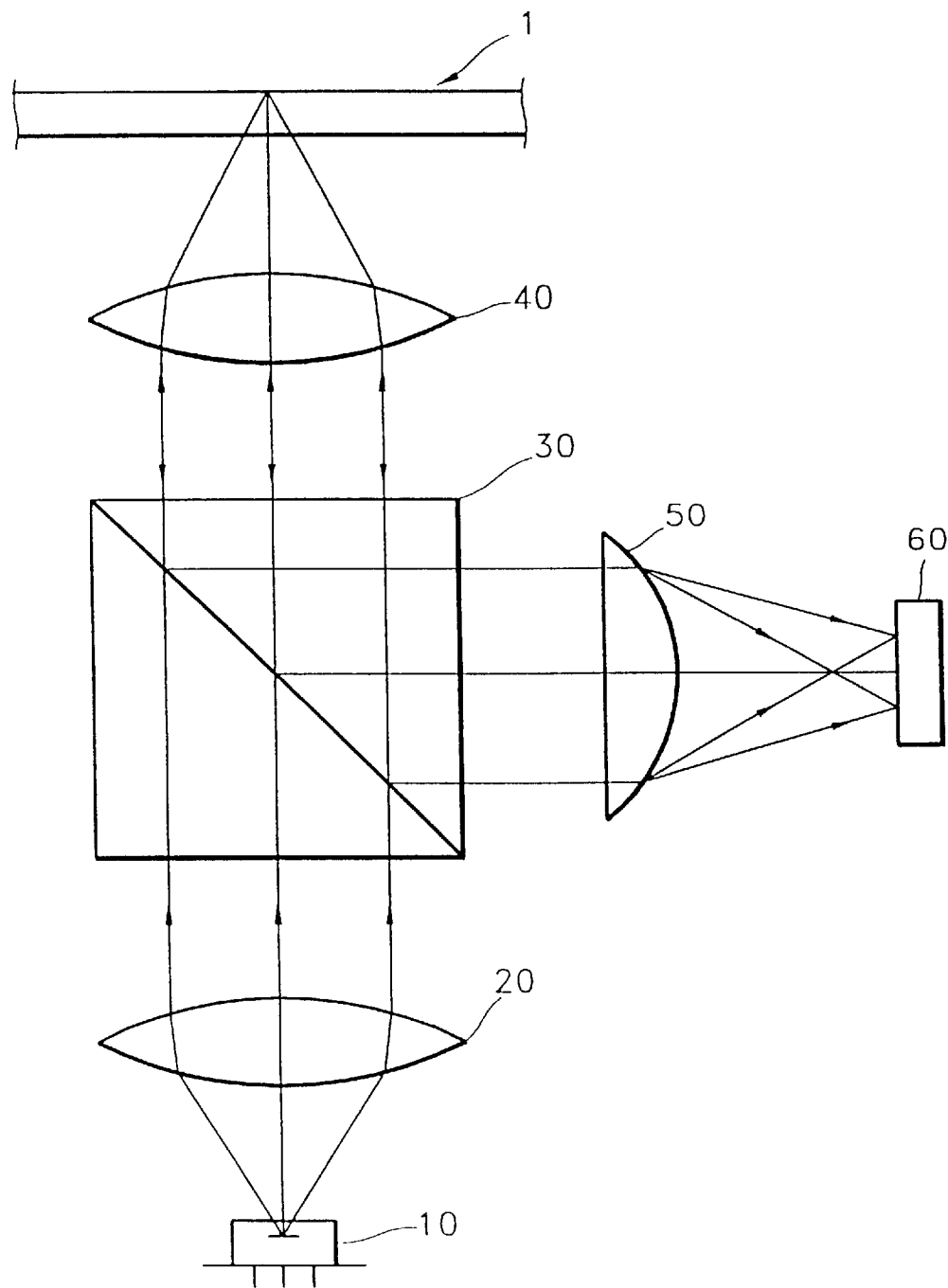
FIG. 1 is a diagram showing the optical arrangement of a general optical pickup.
Figure 6:
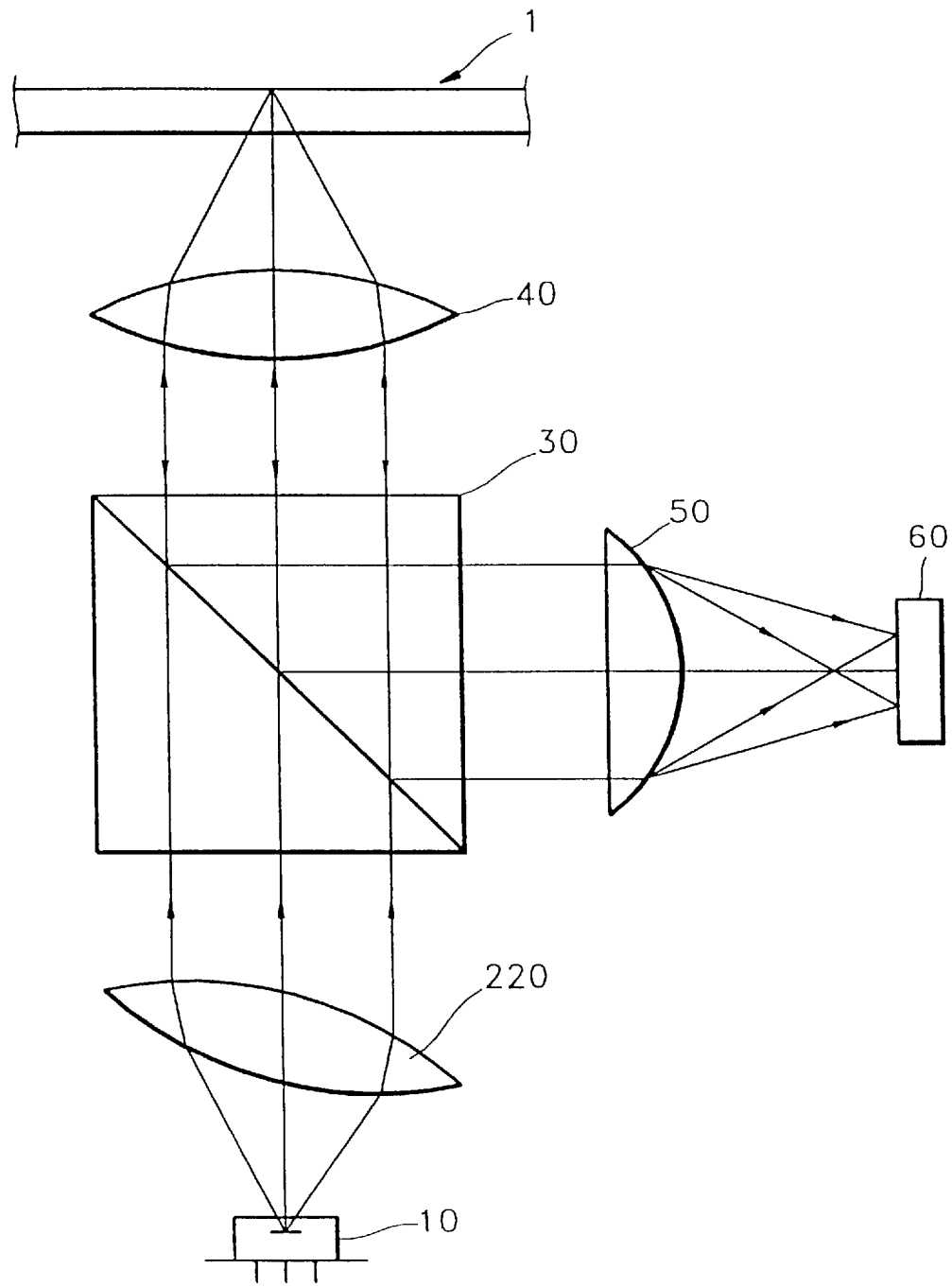
FIG. 6 is a diagram showing the optical arrangement of an optical pickup according to the present invention.

In FIG. 6, the same reference numerals as those of FIG. 1 represent the same elements. An optical pickup according to the present invention includes a light source 10, a collimating lens 220 for collimating a divergent light emitted from the light source 10, light path changing means 30 for changing the traveling path of an incident light, an objective lens 40 for converging the light from the light source 10 to form a light spot on a recording surface of a recording medium 1, and a photodetector 60 for detecting an error signal and an information signal by receiving the light reflected from the recording medium 1 through the light path changing means 30. Here, the light path changing means 30 guides the light from the light source 10 toward the objective lens 40 and guides the light reflected from the recording medium 1 toward the photodetector 60. Preferably, a beam splitter is adopted as the light path changing means 30 as shown in FIG. 6. A holographic optical element (HOE, not shown) also may be adopted as the light path changing means 30.

Also, it is preferable that the optical pickup further includes a cylindrical lens 50 along an optical path between the light path changing means 30 and the photodetector 60 in order to detect a focusing error signal from the light reflected from the recording medium 1 by an astigmatism method.

The light source 10 has an active layer, and generates and emits an elliptical divergent light along the optical axis due to the astigmatic difference caused by the different source points in the thickness and width directions of the active layer. Generally, a small, light edge emitting laser diode is adopted as the light source 10.

Figure 2:
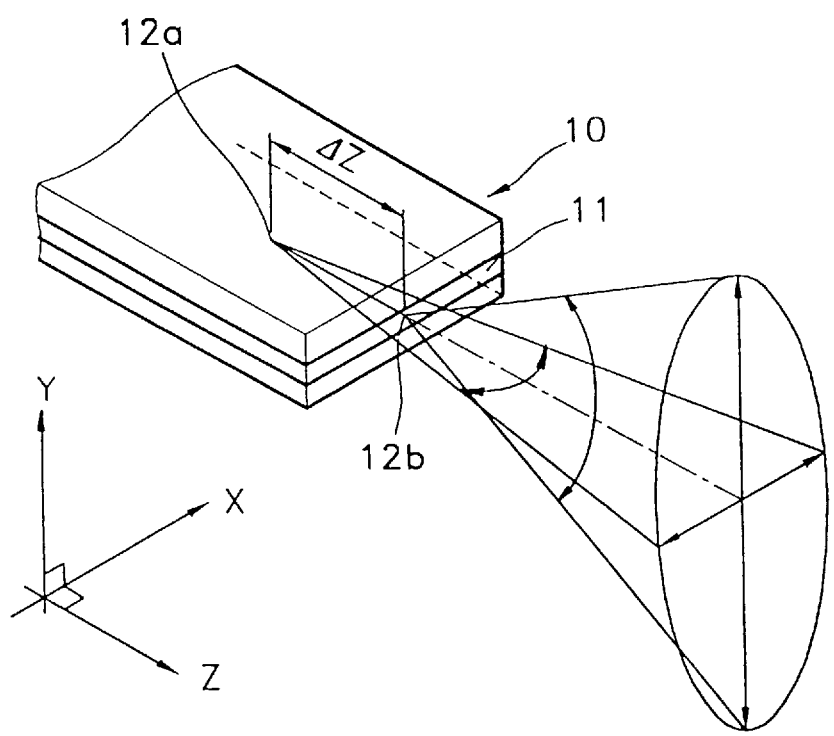
FIG. 2 is a perspective view showing an edge emitting laser diode adopted as the light source of FIG. 1.
Figure 3A:
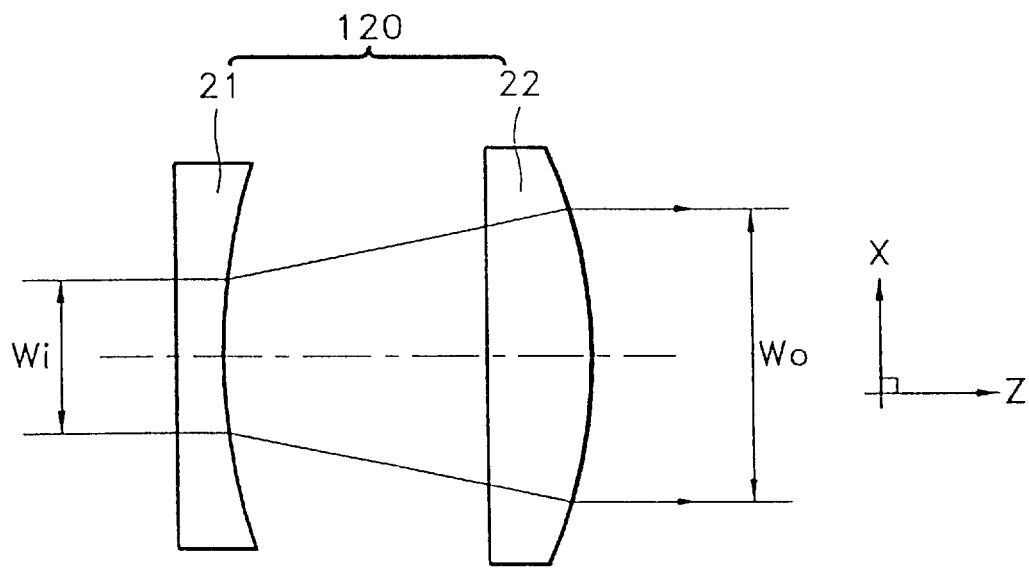
FIGS. 3A and 3B are diagrams illustrating a conventional optical element for correcting an astigmatic difference of a laser beam.
Figure 3B:
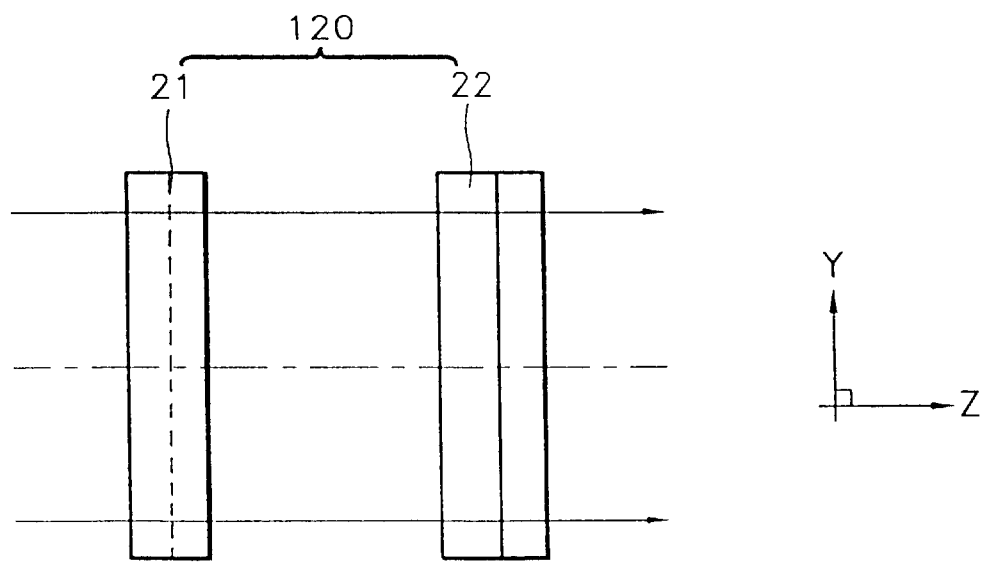
Figure 4:
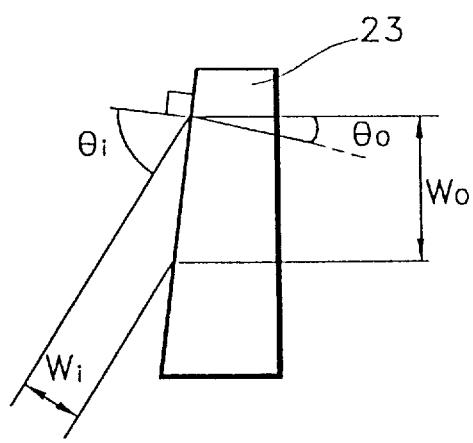
FIG. 4 is a diagram illustrating another conventional optical element for correcting an astigmatic difference of a laser beam.
Figure 5:
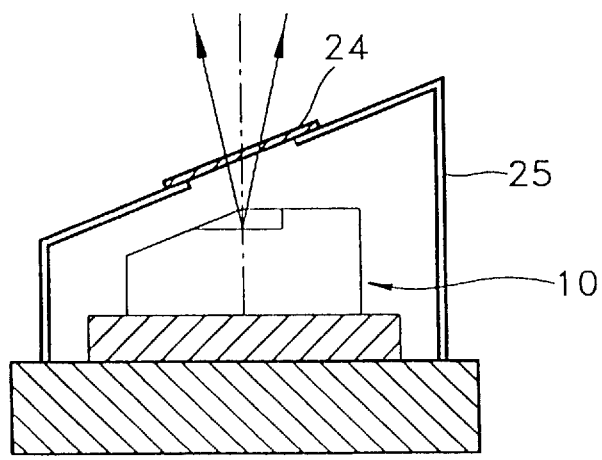
FIG. 5 is a diagram illustrating still another conventional optical element for correcting an astigmatic difference of a laser beam.
Figure 7A:
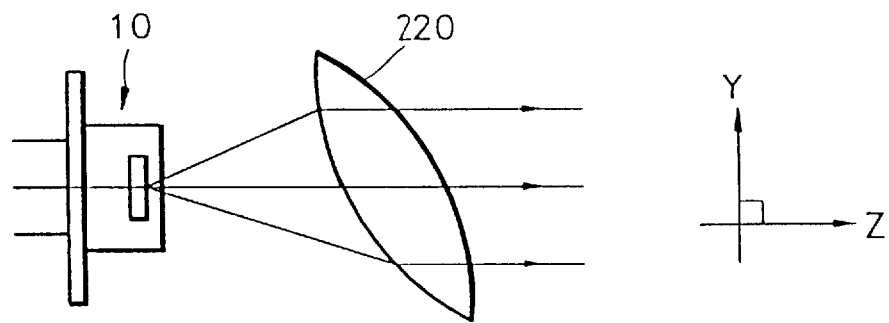
FIGS. 7A and 7B are diagrams schematically showing the optical arrangements of the light source and the collimating lens of the optical pickup according to the present invention.
Figure 7B:
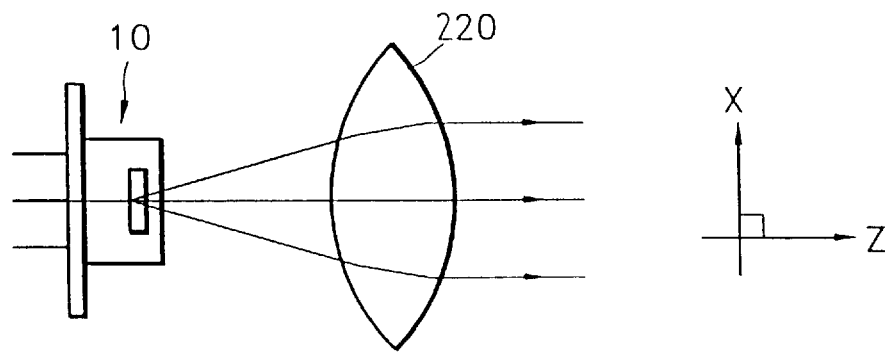

According to the optical pickup of the present invention, the collimating lens 220 is arranged at an angle in order to correct the astigmatic difference of the light emitted from the light source 10. As shown in FIGS. 7A and 7B, the collimating lens 220 is arranged at a predetermined angle along the Y-axis, i.e., the thickness direction of the active layer 11, (see FIG. 2) of the light source 10 which emits a laser beam, and parallel along the X-axis, i.e., the width direction of the active layer 11. The center of the collimating lens 220 coincides with the optical axis of the light.

By arranging the collimating lens 220 as described above, the astigmatic difference of the light emitted from the light source 10 can be reduced.

The effect of the present invention will now be described through the following experimental example.

EXAMPLE

With the wavelength (λ) of the laser diode at 650 nm, the astigmatic difference (ΔZ) at 15 μm, the numerical aperture (NA) of the collimating lens at 0.08, and the focal distance (f) at 25 mm, the wavefront aberration and astigmatism coefficient according to slant angle of the collimating lens are shown in Table 1.

TABLE 1

| slant of collimating lens | | wavefront aberration | astigmatism coefficient |
|---|---|---|---|
| angle (°) | direction | (λ) | (λ) |
| 0 |  | 0.016 | −0.075 |
| 0.3 | along | 0.015 | −0.072 |
| 0.6 | the thickness | 0.013 | −0.062 |
| 0.9 | direction of | 0.011 | −0.047 |
| 1.2 | the active | 0.008 | −0.024 |
| 1.3 | layer | 0.007 | −0.015 |
|  | (Y-axis) |  |  |
| 0.3 | along | 0.016 | −0.078 |
| 0.6 | the width | 0.018 | −0.088 |
| 0.9 | direction of | 0.022 | −0.104 |
| 1.2 | the active | 0.027 | −0.126 |
| 1.3 | layer | 0.029 | −0.135 |
|  | (X-axis) |  |  |

According to Table 1, when the collimating lens is arranged at the angle of 1.3° with respect to the Y-axis, i.e., the thickness direction of the active layer, the wavefront aberration decreases from 0.016λ to 0.007λ. On the other hand, when the collimating lens is arranged at an angle with respect to X-axis, i.e., the width direction of the active layer, the wavefront aberration is increased.

According to the optical pickup of the present invention, the astigmatic difference of light can be corrected by simply arranging the collimating lens at an angle with respect to the thickness (Y-axial) direction of the active layer without installation of additional optical elements such as a cylindrical lens, a prism or a flat glass. Also, since tilting or shifting of the light path does not occur, adjustment of the optical axis is made easy. In addition, since additional optical elements are not required, a compact optical pickup can be manufactured easily.

While the invention has been described with reference to a preferred embodiment, it should be apparent to those skilled in the art that many changes and modifications may be made without departing from the spirit and scope of the invention as defined in the claims.

What is claimed is:

1. An optical pickup comprising:

a light source having an active layer, which generates and emits an elliptical divergent light beam due to an astigmatic difference caused by different source points in a thickness direction and a width direction of said active layer;

a collimating lens arranged at a predetermined angle with respect to the thickness direction of said active layer and parallel to the width direction of said active layer, for collimating the light emitted from said light source;

means, arranged along an optical path between said light source and a recording medium, for changing a traveling path of incident light;

an objective lens arranged along an optical path between said light path changing means and the recording medium, for converging the light from said light source on the recording medium; and a photodetector for detecting information and error signals by receiving a light reflected from the recording medium.

2. An optical pickup as claimed in claim 1, wherein said light source is an edge emitting laser diode.

3. An optical pickup as claimed in claim 1, wherein said collimating lens is arranged at an angle between 0.3° and 1.3° with respect to the thickness direction of said active layer.

4. An optical pickup as claimed in claim 1, wherein said collimating lens is arranged at an angle of 1.3° with respect to the thickness direction of said active layer.

5. An optical pickup as claimed in claim 1, wherein the light beam from said light source has an optical axis and the center of said collimating lens coincides with the optical axis.

6. An optical pickup as claimed in claim 1, wherein said light path changing means is a beam splitter.

7. An optical pickup as claimed in claim 1, further comprising a cylindrical lens installed along an optical path between said light path changing means and said photodetector.

8. An optical pickup as claimed in claim 7, wherein said light path changing means guides the light from the light source incident thereon to said objective lens and guides the light reflected from the recording medium incident thereon to said cylindrical lens.

9. An optical pickup comprising:

a light source having an active layer, which generates and emits an elliptical divergent light beam due to an astigmatic difference caused by different source points in a thickness direction and a width direction of said active layer;

a collimating lens arranged at a predetermined angle with respect to the thickness direction of said active layer and parallel to the width direction of said active layer, for collimating the light emitted from said light source;

light path changing element, arranged along an optical path between said light source and a recording medium, which changes a traveling path of incident light;

an objective lens arranged along an optical path between said light path changing element and the recording medium, for converging the light from said light source on the recording medium; and a photodetector for detecting information and error signals by receiving a light reflected from the recording medium.

\* \* \* \* \*